(12) United States Patent
Lu et al.

(10) Patent No.: US 9,188,807 B2
(45) Date of Patent: Nov. 17, 2015

(54) HARD-SCREEN POLARIZING PLATE FOR LIQUID CRYSTAL SCREEN

(75) Inventors: Zhang Lu, Fuzhou (CN); Hong Huang, Fuzhou (CN); Qiming Yu, Fuzhou (CN)

(73) Assignee: OPTON (FU JIAN) OPTICS CO., LTD, Fuzhou, Fujian (CN)

( * ) Notice: Subject to any disclaimer, the term of this patent is extended or adjusted under 35 U.S.C. 154(b) by 435 days.

(21) Appl. No.: 13/805,090

(22) PCT Filed: Dec. 23, 2010

(86) PCT No.: PCT/CN2010/080164
§ 371 (c)(1),
(2), (4) Date: Dec. 18, 2012

(87) PCT Pub. No.: WO2011/157036
PCT Pub. Date: Dec. 22, 2011

(65) Prior Publication Data
US 2013/0088670 A1    Apr. 11, 2013

(30) Foreign Application Priority Data
Jun. 18, 2010    (CN) .......................... 2010 1 0203715

(51) Int. Cl.
*G02F 1/1335* (2006.01)
*G02B 1/10* (2015.01)
*G02B 5/30* (2006.01)

(52) U.S. Cl.
CPC .......... *G02F 1/133528* (2013.01); *G02B 1/105* (2013.01); *G02B 5/305* (2013.01); *G02B 5/3033* (2013.01); *G02F 2001/133562* (2013.01); *G02F 2201/50* (2013.01)

(58) Field of Classification Search
USPC ...................................... 349/12, 96
See application file for complete search history.

(56) References Cited

U.S. PATENT DOCUMENTS

| | | | |
|---|---|---|---|
| 5,317,434 A * | 5/1994 | Ohara | 349/106 |
| 6,570,707 B1 * | 5/2003 | Murakami et al. | 359/489.07 |
| 2009/0325776 A1 * | 12/2009 | Murata | 501/66 |

* cited by examiner

*Primary Examiner* — Lucy Chien

(57) ABSTRACT

A hard-screen polarizing plate for a liquid crystal screen includes a polyvinyl alcohol film (1) and a protective film (2). The protective film (2) is adhered to a surface of the polyvinyl alcohol film (1) facing a light emitting surface (41) of a liquid crystal cell (4). The hard-screen polarizing plate further includes a glass substrate (3). The glass substrate (3) is adhered to a light emitting surface (12) of the polyvinyl alcohol film (1) for serving as a protective layer of the second light emitting surface (12) of the polyvinyl alcohol film (1). The hard-screen polarizing plate is adhered to a light emitting surface (41) of the liquid crystal cell (4).

9 Claims, 4 Drawing Sheets

HARD-SCREEN POLARIZING PLATE FOR LIQUID CRYSTAL SCREEN

CROSS REFERENCE OF RELATED APPLICATION

This is a U.S. National Stage under 35 U.S.C 371 of the International Application PCT/CN2010/080164, filed Dec. 23, 2010, which claims priority under 35 U.S.C. 119(a-d) to CN 201010203715.9, filed Jun. 18, 2010.

BACKGROUND OF THE PRESENT INVENTION

1. Field of Invention

The present invention relates to a component for a liquid crystal display, and more particularly to a hard-screen polarizing plate component and a liquid crystal screen applying the polarizing plate.

2. Description of Related Arts

The polarizer, which is an optical thin-film composited by multilayers of polymer materials and having a function of generating polarized light, is one of the most important components in Liquid Crystal Displays (LCD). As shown in FIG. 1 of the drawings, polarizers are adhered to both surfaces of a liquid crystal cell 4. The polarizers are respectively called an upper polarizer 01 (or a transmission film) and a lower polarizer 02 (or a reflector film), and has a function to polarize back lights. By changing an electrical signal of a liquid crystal layer in the liquid crystal cell of the liquid crystal display, liquid crystal molecules of the liquid crystal layer generate torsional arrangement and form an optical channel having a certain torsion angle. Therefore, when polarized lights pass through the optical channel, passing quantity and blocked quantity thereof are controlled, so as to display a brightly colorful image.

The common-used upper polarizer currently has a sandwich structure. As shown in FIG. 1 of the drawings, the upper polarizer consists of two layers of protective films 04 and 05, and a polarizing film 03 provided therebetween, wherein the polarizing film 03 is manufactured by processing staining and stretching to polyvinyl alcohol materials. Properties of the polarizing film 03 determine polarized property and transmittance of the polarizing film 03, and influence hue and optical durability thereof as well. The polarizing film 03 made of polyvinyl alcohol is easy to lose polarized property due to water absorbing and color fading. Thus, the protective films 04 and 05 having good optical homogeneity and transparency are required to be provided on both surfaces of the polarizing film 03 respectively, so as to isolate from water and air for protecting the polarizing film. The protective films 04 and 05 are usually made of a cellulose triacetate membrane (TAC). The ultra-violet cut type polarizer or anti-glare type polarizer can be manufactured by applying cellulose triacetate membrane having functions of ultra-violet cut or anti-glare. And the liquid crystal display device is formed by adhering polarizers to glass surfaces 41 of the liquid crystal cell 4.

Since various liquid crystal screens are more and more widely applied, especially the large-screen LCD TV, technological, visual and cost requirements of people for the liquid crystal screen is higher and higher. For example, the structure thereof is required to be ultra thin and frameless, bright and gorgeous screen in appearance, and in practical aspects, the liquid crystal screen is required to have moisture resistance and impact resistance, and has optical property of improving contrast and reducing light-flux loss. With applications of three-dimensional technologies in the liquid crystal display device, the liquid crystal screens are further required to be capable of showing high-level gradation effects of an image. And on the other hand, people require manufacturing costs of the liquid crystal screen to be lower and lower. As important components in the liquid crystal screen, the polarizers, and especially the upper polarizer is directly related to the corresponding properties of the liquid crystal screen. However, the polarizers in prior arts can not fully meet technical requirements mentioned above, which specifically shows as following.

1. Taking a polarizer with a cellulose triacetate membrane as a film of protective layer as an example, since the cellulose triacetate membrane still has some water vapor permeability, wherein permeability thereof is approximately 300 g/m$^2$/day, protective capability thereof is slightly insufficient under conditions of high temperature and high humidity.

2. After a hard coat layer is added, scratching resistance of a surface of the protective layer is capable of reaching a maximum value of 3H (surface hardness) in theory. However, since the polarizer is made of flexible materials and thickness thereof is approximately 300 μm, when the polarizer is adhered directly to a fragile glass surface of the liquid crystal cell, the polarizer does not have sufficient rigidity to meet high requirements for scratching resistance.

3. Since the polarizer is made of flexible materials and is not capable of protecting the liquid crystal cell, the liquid crystal cell is easily damaged when the liquid crystal screen is impacted by external force or impressed by large pressure.

4. As shown in FIG. 2 of the drawings, in order to prevent external light interference, a light emitting surface of a protective film 04 is usually treated by a rough surface, in such a manner that an effect of anti-glare is achieved. However, treating of the rough surface has a dual character, i.e., although the treating of the rough surface achieves an object of scattering external obtrusive lights, the rough surface has a scattering effect on lights emitted by the liquid crystal cell as well, which reduces a property of contrast of the liquid crystal screen.

Currently, hard screen techniques having improvements on appearance structures and security of the display comes into application, which has achieved characteristics such as frameless surface, gorgeous and impact resistance of the display. As shown in FIG. 3 of the drawings, a hard screen 09 as shown is formed by adding a high transparency hard material 06, such as organic glass (acrylic plate) and printed black frame glass. Two surfaces of the high transparency hard material 06 need to be respectively adhered with a protective film 07. The hard screen 09 which is relatively independently added does not relate to basic structure of the liquid crystal screen formed by polarizer. Due to gaps between the hard screen 09 and the liquid crystal screen, polarized lights emitted by the liquid crystal screen generates secondary refraction and internal reflection, so that quality of images displayed thereof is directly influenced. As an improvement, light-conductive resin 08 is filled between the hard screen 09 and the polarizer 01, which solves a problem of secondary refraction by application of the hard screen, but increases difficulty of manufacturing process and costs thereof as well.

SUMMARY OF THE PRESENT INVENTION

An object of the present invention is to provide a hard-screen polarizing plate having functions of transmitted polarization, anti-reflection, reflection reduction, impact-resistance, ultra-thin overall structure, and flat decoration.

Accordingly, in order to accomplish the above objects, the present invention provides a hard-screen polarizing plate for a liquid crystal screen, which is adhered to a light emitting surface of a liquid crystal cell, and comprises a polyvinyl alcohol film and a first protective film, wherein the first protective film is adhered to a surface of the polyvinyl alcohol film facing the light emitting surface of the liquid crystal cell, wherein the hard-screen polarizing plate further comprises a glass substrate which is adhered to the light emitting surface of the polyvinyl alcohol film for serving as a protective layer thereof.

Compared with the prior art, structures of the hard-screen polarizing plate for the liquid crystal screen mentioned above has advantages as following.

1. Since the polarizing plate comprises the glass substrate as a component, capability of impact-resistant and press-resistant from external of the liquid crystal screen is improved. Compared with hard screens in the prior art, the hard-screen polarizing plate of the present invention reduces thickness of the liquid crystal screen effectively while ensuring hardness thereof.

2. Application of the glass substrate improves scratching resistance of a surface of the liquid crystal screen.

3. The glass substrate has a low water vapor permeability and is capable of protecting the polyvinyl alcohol film effectively even under an environments of high temperature and high pressure.

4. Since each layer of the polarizer is very light and thin, and achieves sufficient strength, liquid crystal device employing the polarizing plate can be designed with a frameless structure.

5. Due to refracting function of the glass substrate thereof, when emergent ray passes through a hard-screen polarizer, horizontal viewing angle of the liquid crystal display is expanded.

6. Internal reflection characteristic of the glass substrate has efficiently improved high-level gradation effect of pictures of image, which creates conditions for fully utilizing of a three-dimensional technique.

7. The hard-screen polarizing plate has not only an integrated structure with multi-functions, but also a much lower comprehensive manufacturing cost compared with the "hard screen" and a "liquid crystal added screen" as well.

A second protective film is adhered to a light emitting surface of the glass substrate of the hard-screen polarizing plate. The second protective film is capable of protecting the light emitting surface of the glass substrate. In addition, the polarizing plate having a special function and a special application effect is manufactured by treating the second protective film, or manufacturing the protective layer with materials having special optical properties.

At least one coating layer selected from the group consisting of an anti-reflective evaporation film, a scratch-resistance evaporation film and an anti-static evaporation film is evaporated on light emitting surfaces of the hard-screen polarizing plate. The anti-reflective evaporation film has an anti-reflective function, so as to improve optical contrast property of the liquid crystal screen. The scratch-resistance evaporation film further improves a scratch-resistance capability of the surface of the liquid crystal screen. And the anti-static evaporation film is capable of effectively reducing electrostatic charges carried by the surface of the hard-screen polarizing plate.

Each protective layer of the present invention is a cellulose triacetate membrane or a polyethylene terephthalate membrane which have a high transparency. The first protective layer and the second protective layer employ various materials for manufacturing a protective layer of a liquid crystal polarizer in the conventional arts, wherein the cellulose triacetate membrane or the polyethylene terephthalate membrane is preferred.

The glass substrate of the present invention is a flat glass having a thickness of 0.5 mm~2.5 mm, and preferably 0.7 mm~1.1 mm. The glass substrate having the thickness mentioned above both has a sufficient flexibility and a physical strength, so as to provide convenience for related adhere treating and processing on the hard-screen polarizing plate and the light emitting surface of the liquid crystal cell.

The glass substrate of the hard-screen polarizing plate is processed with a strengthening treatment. The strengthening treatment is preferably embodied as a chemical tempering treatment or an air-cooled toughening treatment. After the strengthening treatment, a surface compressive stress value of the glass substrate is over 450 Mpa. Methods of the strengthening are all well-known methods for glass tempering in the conventional arts, such as an ion exchange method in chemical tempering. The glass substrate tempered is capable of providing a higher utilizing strength for the liquid crystal screen.

A pattern is optionally printed on two surfaces of the glass substrate or the surface of the second protective layer facing the light emitting surface of the liquid crystal cell. The pattern of the glass substrate is printed by silk screen printing, printing ink thereof is resin ink which is treated by infrared drying, ultraviolet radiation curing ink or sintered ceramic ink, and the pattern of the second protective layer is offset printed. The pattern printed is preferably embodied as a border of a display, a trademark, a functional icon, a remote control semi-transparent window or other decorative patterns. Designing of multiple patterns can meet requirements for different appearances of manufactures and consumers.

Adherence between layers of each film is performed by optical pressure-sensitive adhesive. An optical pressure-sensitive adhesive layer and a release protective film are provided on a surface of the first protective layer facing the light emitting surface of the liquid crystal cell. The release protective film is not uncovered after completing manufacture of the hard-screen polarizing plate, so as to facilitate transportation and storage of the hard-screen polarizing plate. The release protective film is uncovered for installing the light emitting surface of the liquid crystal cell, when requiring adhering the hard-screen polarizing plate to the light emitting surface of the liquid crystal cell.

In conclusion, the hard-screen polarizing plate of the present invention integrates functions of transmitted polarization, anti-reflection, reflection reduction, impact-resistance, ultra-thin overall structure, and flat decoration, so as to replace conventional a flexible polarizer. The hard-screen polarizing plate of the present invention overcomes shortcomings that the flexible polarizer is not capable of overcoming, such as loss of contrast, poor security protection, no decorative effect, requiring a wrap-round frame in structures of the liquid crystal screen.

BRIEF DESCRIPTION OF THE DRAWINGS

Further description is illustrated in detail combining with the accompanying drawings and the preferred embodiments as following.

DETAILED DESCRIPTION OF THE PREFERRED EMBODIMENT

Figure 1:
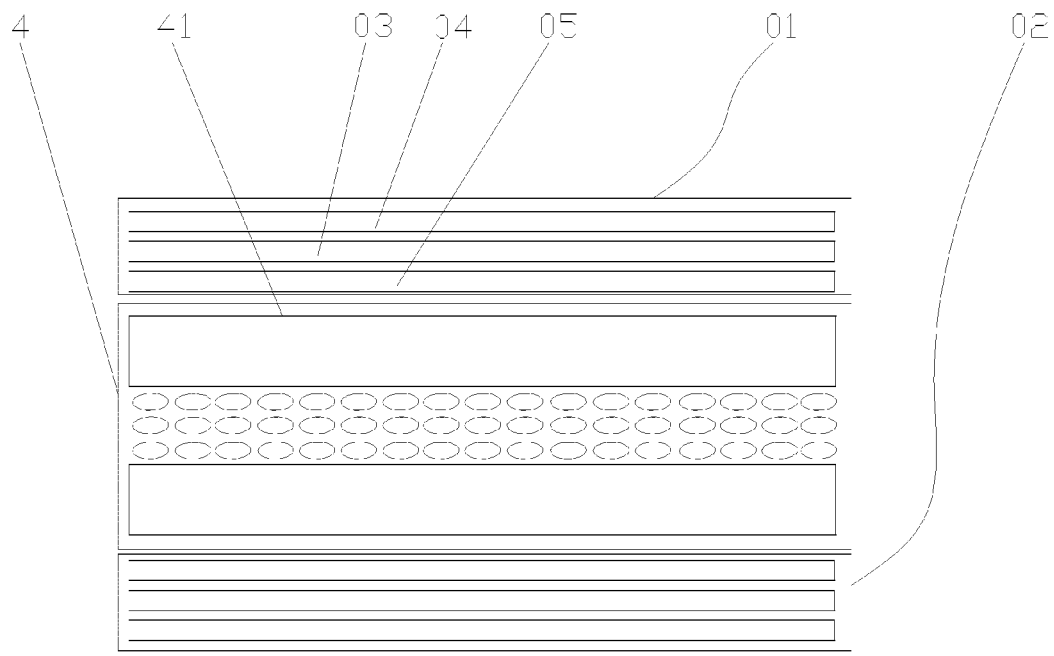
FIG. 1 is a structural sketch view of a liquid crystal screen in a prior art.
Figure 2:
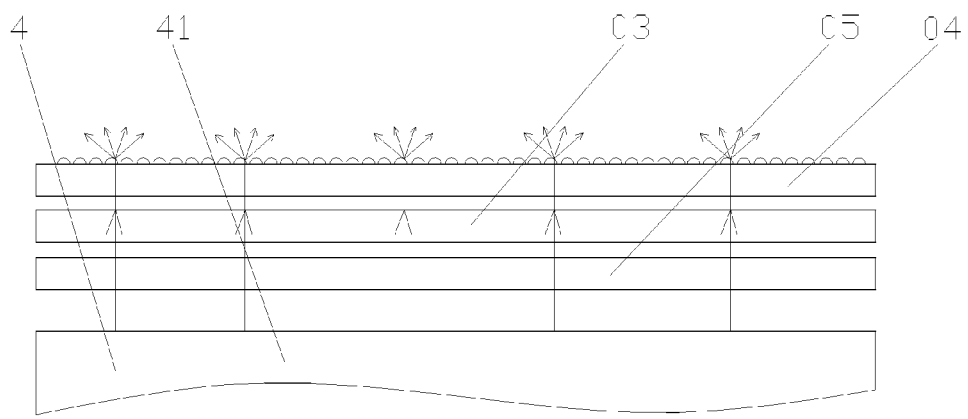
FIG. 2 is a light road map of emergent ray on a rough surface of a cellulose triacetate membrane in a polarizer of a prior art.
Figure 3:
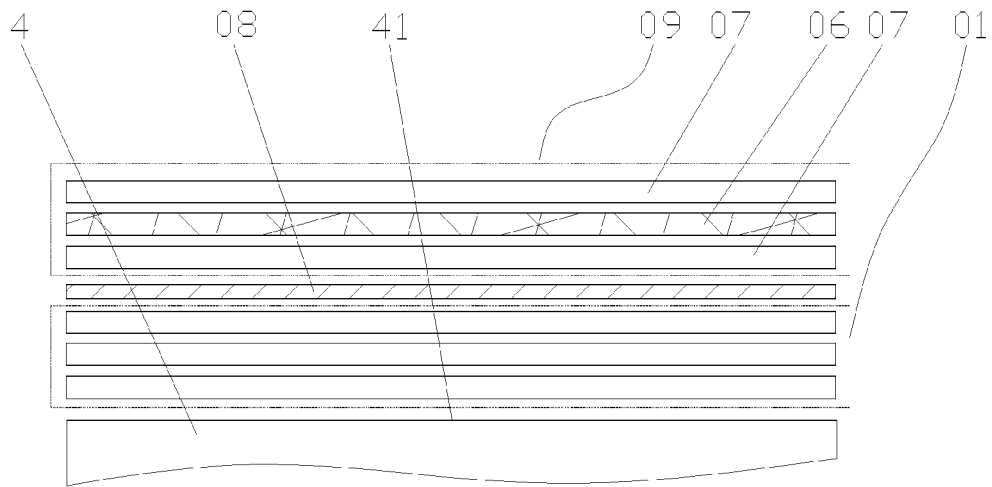
FIG. 3 is a structural view of a hard screen in a prior art.

Referring to FIGS. 4-8 of the drawings, a hard-screen polarizing plate of the present invention, which is adhered to a light emitting surface 41 of a liquid crystal cell 4, comprises a polyvinyl alcohol film 1 and a first protective film 2. The first protective film 2 is adhered to a surface 11 of the polyvinyl alcohol film 1 facing a light emitting surface 41 of the liquid crystal cell 4, wherein the hard-screen polarizing plate further comprises a glass substrate 3 adhered to a light emitting surface 12 of the polyvinyl alcohol film 1 for serving as a protective layer of the second light emitting surface 12 of the polyvinyl alcohol film 1.

A second protective film 5 is adhered to a light emitting surface 31 of the glass substrate 3 of the hard-screen polarizing plate of the present invention.

At least one coating layer selected from the group consisting of an anti-reflective evaporation film, a scratch-resistance evaporation film and an anti-static evaporation film is evaporated on the light emitting surfaces.

The glass substrate 3 of the present invention is a flat glass having a thickness of 0.5 mm~2.5 mm, and preferably 0.7 mm~1.1 mm.

The glass substrate 3 of the present invention is processed with a strengthening treatment. The strengthening treatment is preferably embodied as a chemical tempering treatment or an air-cooled toughening treatment. After the strengthening treatment, a surface compressive stress value of the glass substrate 3 is over 450 Mpa, passing falling ball test over 2 J (0.6 M/500 g), a plane thereof has no S-shaped deformation, and a bow deformation thereof is less than 1/100. Methods of the strengthening are all well-known methods for glass tempering in the conventional arts, such as an ion exchange method in chemical tempering.

The first protective layer 2 and the second protective layer 5 employ various materials for manufacturing a protective layer of a liquid crystal polarizer in the conventional arts, which are preferably embodied as a cellulose triacetate membrane or a polyethylene terephthalate membrane.

A pattern 8 is printed on a surface of the glass substrate 3 or the surface of the second protective layer 5 facing the light emitting surface 41 of the liquid crystal cell 4. The pattern 8 printed is preferably embodied as a border of a display, a trademark, a functional icon, a remote control semitransparent window or other decorative patterns.

Preferably, adherence between layers of each film is performed by optical pressure-sensitive adhesive. An optical pressure-sensitive adhesive layer 7 and a release protective film 71 are provided on a surface 21 of the first protective layer 2 facing the light emitting surface 41 of the liquid crystal cell 4. The release protective film 71 is not uncovered after completing manufacture of the hard-screen polarizing plate, so as to facilitate transportation and storage of the hard-screen polarizing plate. The release protective film 71 is uncovered to expose the optical pressure-sensitive adhesive layer 7 for installing onto the light emitting surface 41 of the liquid crystal cell 4, when the hard-screen polarizing plate is required to be adhered to the light emitting surface 41 of the liquid crystal cell 4.

Preferably, after completing manufacture of the hard-screen polarizing plate, a thin film 6 which is removable and leaving no trace is covered on the light emitting surfaces of the hard-screen polarizing plate.

Embodiment 1

Figure 4:
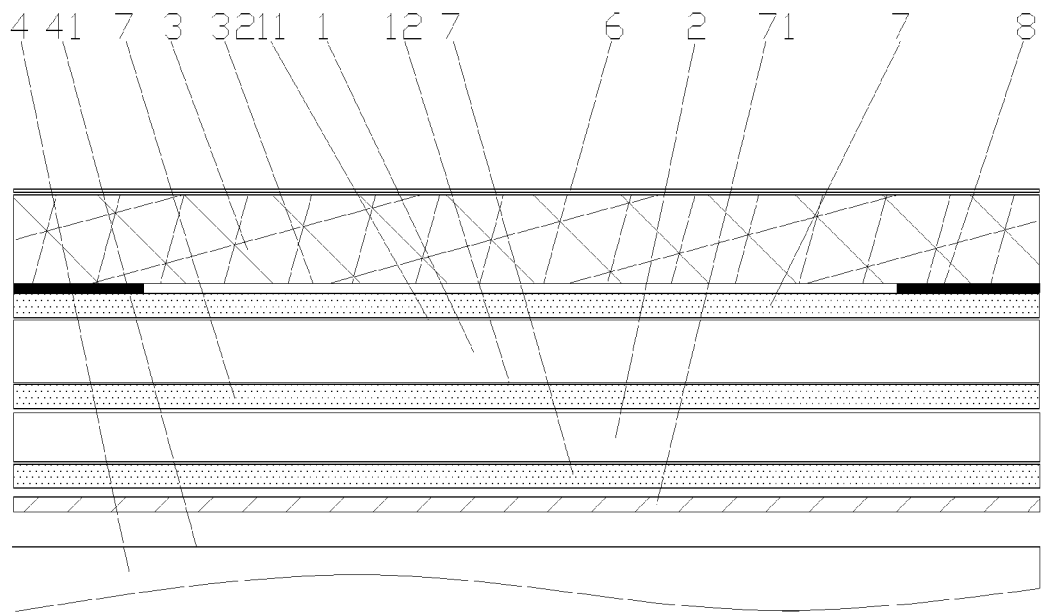
FIG. 4 is a first structural sketch view of a hard-screen polarizing plate according to a preferred embodiment 1 of the present invention.

As shown in FIG. 4 of the drawings, a hard-screen polarizing plate of the present invention, which is adhered to a light emitting surface 41 of a liquid crystal cell 4, comprises a polyvinyl alcohol film 1 and a cellulose triacetate membrane 2. The cellulose triacetate membrane 2 is adhered to a surface 11 of the polyvinyl alcohol film 1 facing a light emitting surface 41 of the liquid crystal cell 4, wherein the hard-screen polarizing plate further comprises a glass substrate 3 having a thickness of 0.5 mm, which is adhered to a light emitting surface 12 of the polyvinyl alcohol film 1. Adherence between layers of each film is performed by an optical pressure-sensitive adhesive layer 7. A decorative pattern 8 by silk screen printing is provided on a surface 32 of the glass substrate 3 facing the light emitting surface 41 of the liquid crystal cell 4.

Embodiment 2

Figure 5:
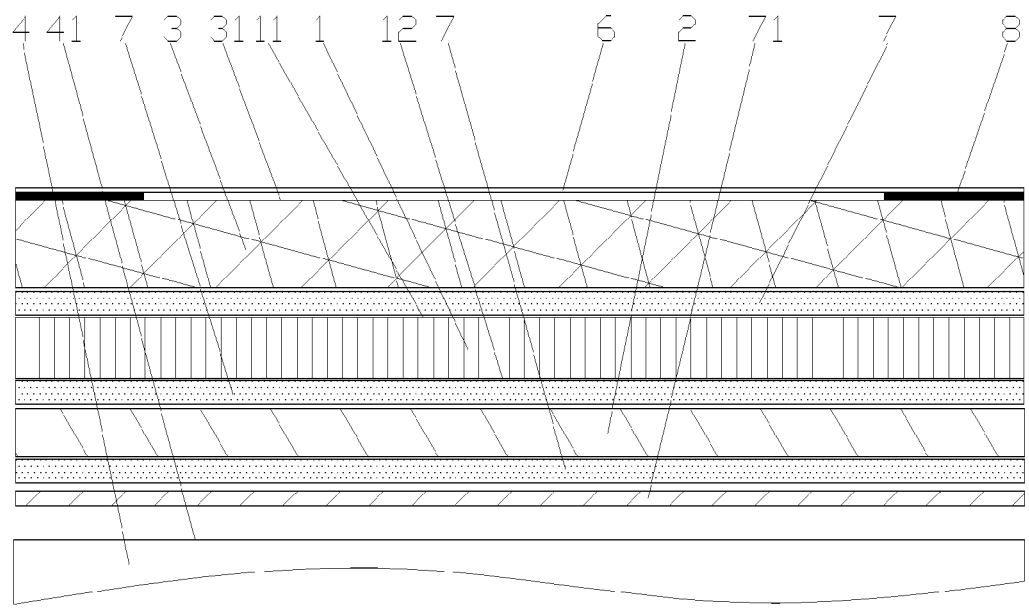
FIG. 5 is a second structural sketch view of the hard-screen polarizing plate according to the preferred embodiment 2 of the present invention.

As shown in FIG. 5 of the drawings, a hard-screen polarizing plate of the present invention, which is adhered to a light emitting surface 41 of a liquid crystal cell 4, comprises a polyvinyl alcohol film 1 and a polyethylene terephthalate membrane 2. The polyethylene terephthalate membrane 2 is adhered to a surface 11 of the polyvinyl alcohol film 1 facing a light emitting surface 41 of the liquid crystal cell 4, wherein the hard-screen polarizing plate further comprises a glass substrate 3 having a thickness of 2.5 mm, which is adhered to a light emitting surface 12 of the polyvinyl alcohol film 1. Adherence between layers of each film is performed by an optical pressure-sensitive adhesive layer 7. A decorative pattern 8 by silk screen printing is provided on a light emitting surface 31 of the glass substrate 3.

Embodiment 3

Figure 6:
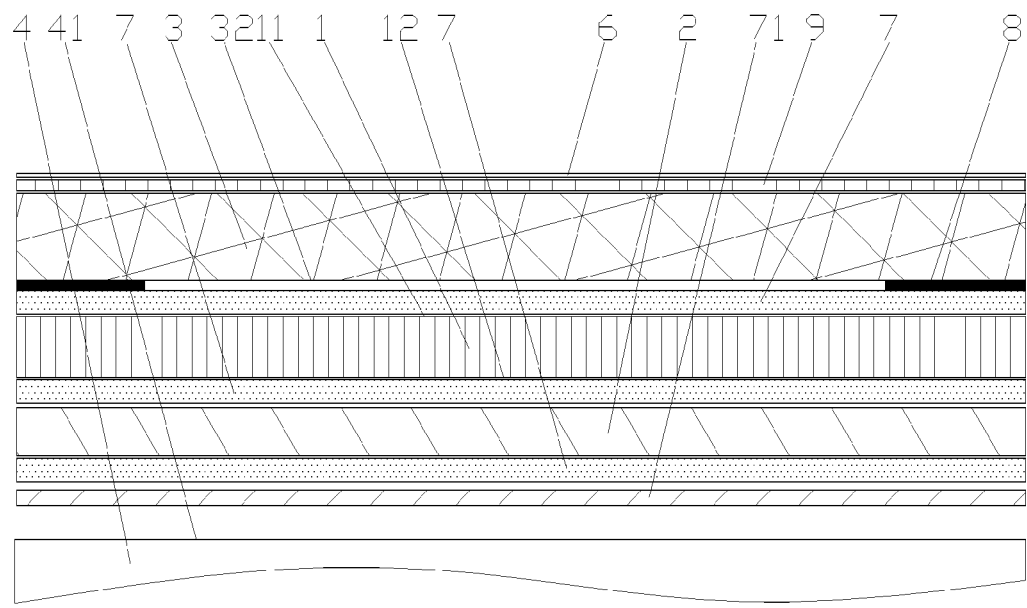
FIG. 6 is a structural sketch view of a hard-screen polarizing plate according to a preferred embodiment 3 of the present invention.

As shown in FIG. 6 of the drawings, a hard-screen polarizing plate of the present invention, which is adhered to a light emitting surface 41 of a liquid crystal cell 4, comprises a polyvinyl alcohol film 1 and a cellulose triacetate membrane 2. The cellulose triacetate membrane 2 is adhered to a surface 11 of the polyvinyl alcohol film 1 facing a light emitting surface 41 of the liquid crystal cell 4, wherein the hard-screen polarizing plate further comprises a glass substrate 3 having a thickness of 0.7 mm, which is adhered to a light emitting surface 12 of the polyvinyl alcohol film 1. Adherence between layers of each film is performed by an optical pressure-sensitive adhesive layer 7. A decorative pattern 8 by silk screen printing is provided on a surface 32 of the glass substrate 3 facing the light emitting surface 41 of the liquid crystal cell 4.

Embodiment 4

Figure 7:
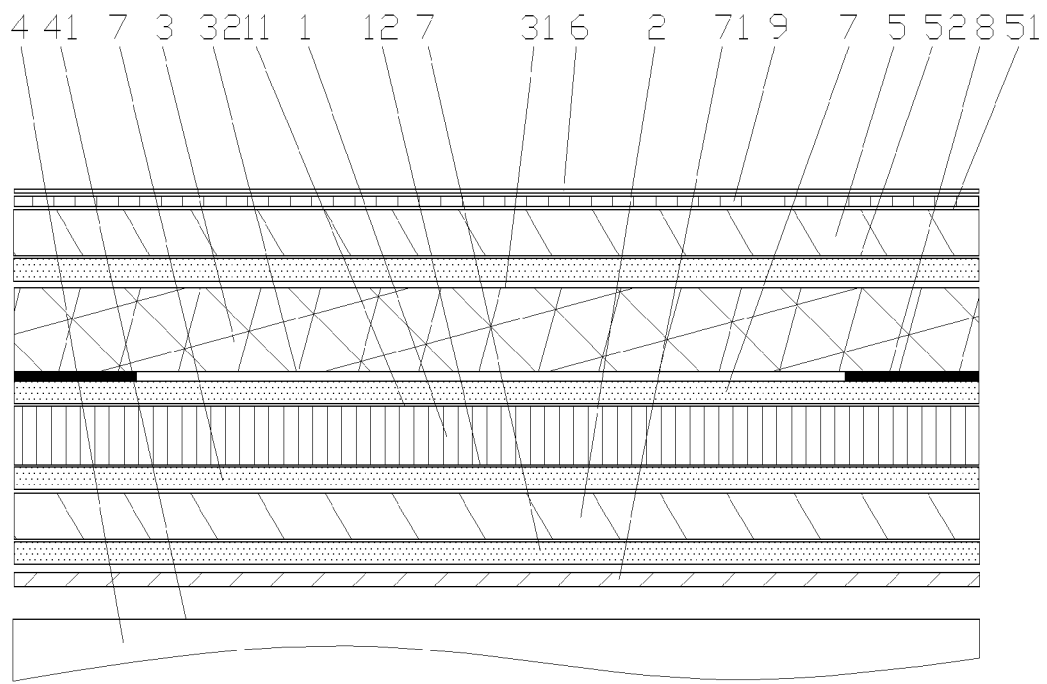
FIG. 7 is a structural sketch view of a hard-screen polarizing plate according to a preferred embodiment 4 of the present invention.

As shown in FIG. 7 of the drawings, a hard-screen polarizing plate of the present invention, which is adhered to a light emitting surface 41 of a liquid crystal cell 4, comprises a polyvinyl alcohol film 1 and a polyethylene terephthalate membrane 2. The polyethylene terephthalate membrane 2 is adhered to a surface 11 of the polyvinyl alcohol film 1 facing a light emitting surface 41 of the liquid crystal cell 4, wherein the hard-screen polarizing plate further comprises a glass substrate 3 having a thickness of 1.1 mm, which is adhered to a light emitting surface 12 of the polyvinyl alcohol film 1. A second polyethylene terephthalate membrane 5 is adhered to a light emitting surface 31 of the glass substrate 3. Adherence between layers of each film is performed by an optical pressure-sensitive adhesive layer 7. A decorative pattern 8 by silk screen printing is provided on the light emitting surface 31 of the glass substrate 3. A scratch-resistance evaporation film 9 is provided on a light emitting surface 51 of the second polyethylene terephthalate membrane 5.

Embodiment 5

Figure 8:
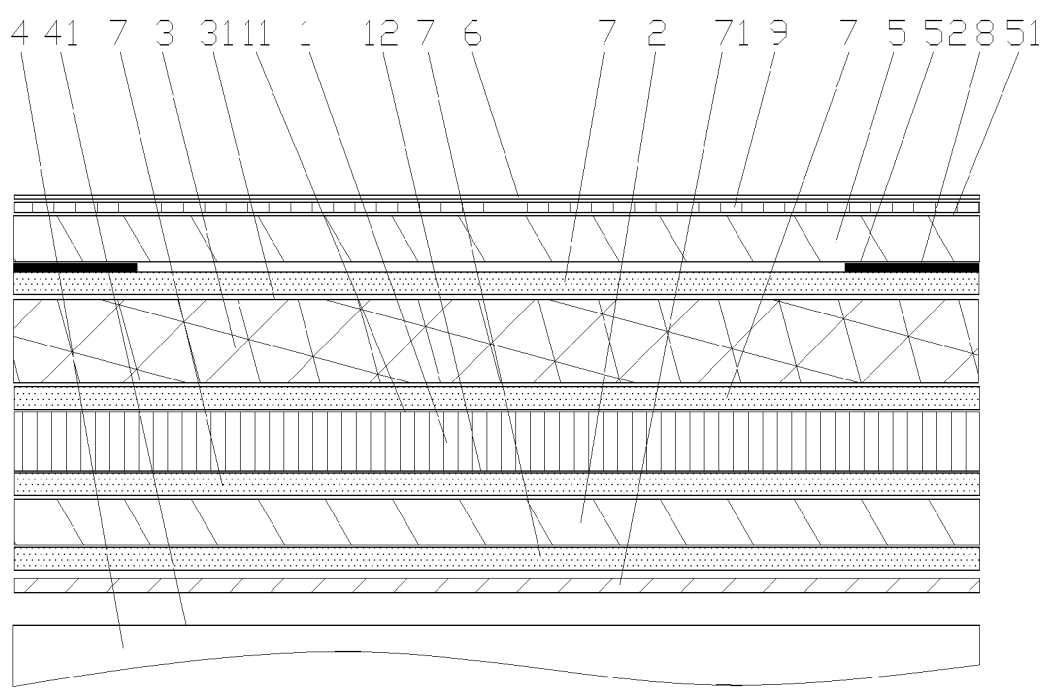
FIG. 8 is a structural sketch view of a hard-screen polarizing plate according to preferred embodiments 5-7 of the present invention.

As shown in FIG. 8 of the drawings, a hard-screen polarizing plate of the present invention, which is adhered to a light emitting surface 41 of a liquid crystal cell 4, comprises a polyvinyl alcohol film 1 and a cellulose triacetate membrane 2. The cellulose triacetate membrane 2 is adhered to a surface 11 of the polyvinyl alcohol film 1 facing a light emitting surface 41 of the liquid crystal cell 4, wherein the hard-screen polarizing plate further comprises a glass substrate 3 having a thickness of 0.55 mm, which is adhered to a light emitting surface 12 of the polyvinyl alcohol film 1. A second cellulose triacetate membrane 5 is adhered to a light emitting surface 31 of the glass substrate 3. Adherence between layers of each film is performed by an optical pressure-sensitive adhesive layer 7. A decorative pattern 8 is offset printed on a surface 52 of the second cellulose triacetate membrane 5 facing the light emitting surface 41 of the liquid crystal cell 4. An anti-reflective evaporation film, a scratch-resistance evaporation film and an anti-static evaporation film 9 is evaporated on a light emitting surface 51 of the second cellulose triacetate membrane 5.

Embodiment 6

As shown in FIG. 8 of the drawings, a hard-screen polarizing plate of the present invention, which is adhered to a light emitting surface 41 of a liquid crystal cell 4, comprises a polyvinyl alcohol film 1 and a polyethylene terephthalate membrane 2. The polyethylene terephthalate membrane 2 is adhered to a surface 11 of the polyvinyl alcohol film 1 facing a light emitting surface 41 of the liquid crystal cell 4, wherein the hard-screen polarizing plate further comprises a glass substrate 3 having a thickness of 1.8 mm, which is adhered to a light emitting surface 12 of the polyvinyl alcohol film 1. A second polyethylene terephthalate membrane 5 is adhered to a light emitting surface 31 of the glass substrate 3. Adherence between layers of each film is performed by an optical pressure-sensitive adhesive layer 7. A decorative pattern 8 is offset printed on a surface 52 of the second polyethylene terephthalate membrane 5 facing the light emitting surface 41 of the liquid crystal cell 4. An anti-reflective evaporation film and an anti-static evaporation film 9 is evaporated on a light emitting surface 51 of the second polyethylene terephthalate membrane 5.

Embodiment 7

As shown in FIG. 8 of the drawings, a hard-screen polarizing plate of the present invention, which is adhered to a light emitting surface 41 of a liquid crystal cell 4, comprises a polyvinyl alcohol film 1 and a polyethylene terephthalate membrane 2. The polyethylene terephthalate membrane 2 is adhered to a surface 11 of the polyvinyl alcohol film 1 facing a light emitting surface 41 of the liquid crystal cell 4, wherein the hard-screen polarizing plate further comprises a glass substrate 3 having a thickness of 0.9 mm, which is adhered to a light emitting surface 12 of the polyvinyl alcohol film 1. A second polyethylene terephthalate membrane 5 is adhered to a light emitting surface 31 of the glass substrate 3. Adherence between layers of each film is performed by an optical pressure-sensitive adhesive layer 7. A decorative pattern 8 is offset printed on a surface 52 of the second polyethylene terephthalate membrane 5 facing the light emitting surface 41 of the liquid crystal cell 4. An anti-reflective evaporation film and an anti-static evaporation film 9 is evaporated on a light emitting surface 51 of the second polyethylene terephthalate membrane 5.

What is claimed is:

1. A hard-screen polarizing plate for a liquid crystal screen, for being adhered to a light emitting surface of a liquid crystal cell, comprising a polyvinyl alcohol film and a first protective film, wherein the protective film is adhered to a surface of said polyvinyl alcohol film facing the light emitting surface of the liquid crystal cell, wherein said hard-screen polarizing plate further comprises a glass substrate which is adhered to a light emitting surface of said polyvinyl alcohol film;

wherein a second protective layer is adhered to a light emitting surface of said glass substrate;

at least one coating layer selected from the group consisting of an anti-reflective evaporation film, a scratch-resistance evaporation film and an anti-static evaporation film is evaporated on a light emitting surface of said glass substrate and a light emitting surface of said second protective layer;

said first protective layer and said second protective layer are cellulose triacetate membranes or polyethylene terephthalate membranes which have a high transparency; and said glass substrate is a flat glass having a thickness of 0.7-1.1 mm;

said glass substrate is processed with a strengthening treatment, and a surface compressive stress value of said glass substrate is over 450 Mpa.

2. The hard-screen polarizing plate for the liquid crystal screen, as recited in claim 1, wherein said strengthening treatment of said glass substrate is a chemical tempering treatment or an air-cooled toughening treatment.

3. The hard-screen polarizing plate for the liquid crystal screen, as recited in claim 1, wherein a pattern is printed on said glass substrate or said surface of said second protective layer facing the light emitting surface of the liquid crystal cell.

4. The hard-screen polarizing plate for the liquid crystal screen, as recited in claim 3, wherein said pattern of said glass substrate is printed by silk screen printing, printing ink thereof is resin ink which is treated by infrared drying, ultraviolet radiation curing ink or sintered ceramic ink, and said pattern of said second protective layer is offset printed.

5. The hard-screen polarizing plate for the liquid crystal screen, as recited in claim 3, wherein said pattern is single color printing or multi-color printing.

6. The hard-screen polarizing plate for the liquid crystal screen, as recited in claim 1, wherein adherence between layers of each film is performed by optical pressure-sensitive adhesive.

7. The hard-screen polarizing plate for the liquid crystal screen, as recited in claim 2, wherein adherence between layers of each film is performed by optical pressure-sensitive adhesive.

8. The hard-screen polarizing plate for the liquid crystal screen, as recited in claim 1, wherein an optical pressure-sensitive adhesive layer and a release protective film are respectively provided on a surface of said first protective layer facing the light emitting surface of the liquid crystal cell.

9. A hard-screen polarizing plate for a liquid crystal screen, for being adhered to a light emitting surface of a liquid crystal cell, comprising a polyvinyl alcohol film and a first protective film, wherein the protective film is adhered to a surface of said polyvinyl alcohol film facing the light emitting surface of the liquid crystal cell, wherein said hard screen polarizing plate further comprises a glass substrate which is adhered to a light emitting surface of said polyvinyl alcohol film;

wherein a second protective layer is adhered to a light emitting surface of said glass substrate;

at least one coating layer selected from the group consisting of an anti-reflective evaporation film, a scratch-resistance evaporation film and an anti-static evaporation film is evaporated on a light emitting surface of said glass substrate and a light emitting surface of said second protective layer;

said first protective layer and said second protective layer are cellulose triacetate membranes or polyethylene terephthalate membranes which have a high transparency; and said glass substrate is a flat glass having a thickness of 0.7-1.1 mm;

wherein said glass substrate is processed with a strengthening treatment, and a surface compressive stress value of said glass substrate is over 450 Mpa;

wherein said strengthening treatment of said glass substrate is a chemical tempering treatment or an air-cooled toughening treatment;

a pattern is printed on said glass substrate or said surface of said second protective layer facing the light emitting surface of the liquid crystal cell;

said pattern of said glass substrate is printed by silk screen printing, printing ink thereof is resin ink which is treated by infrared drying, ultraviolet radiation curing ink or sintered ceramic ink, and said pattern of said second protective layer is offset printed;

said pattern is single color printing or multi-color printing;

adherence between layers of each film is performed by optical pressure-sensitive adhesive; and an optical pressure-sensitive adhesive layer and a release protective film are respectively provided on a surface of said first protective layer facing the light emitting surface of the liquid crystal cell.

* * * * *